June 21, 1949.   I. L. RUIZ   2,473,910
CRAB TRAP
Filed July 28, 1944   2 Sheets-Sheet 2
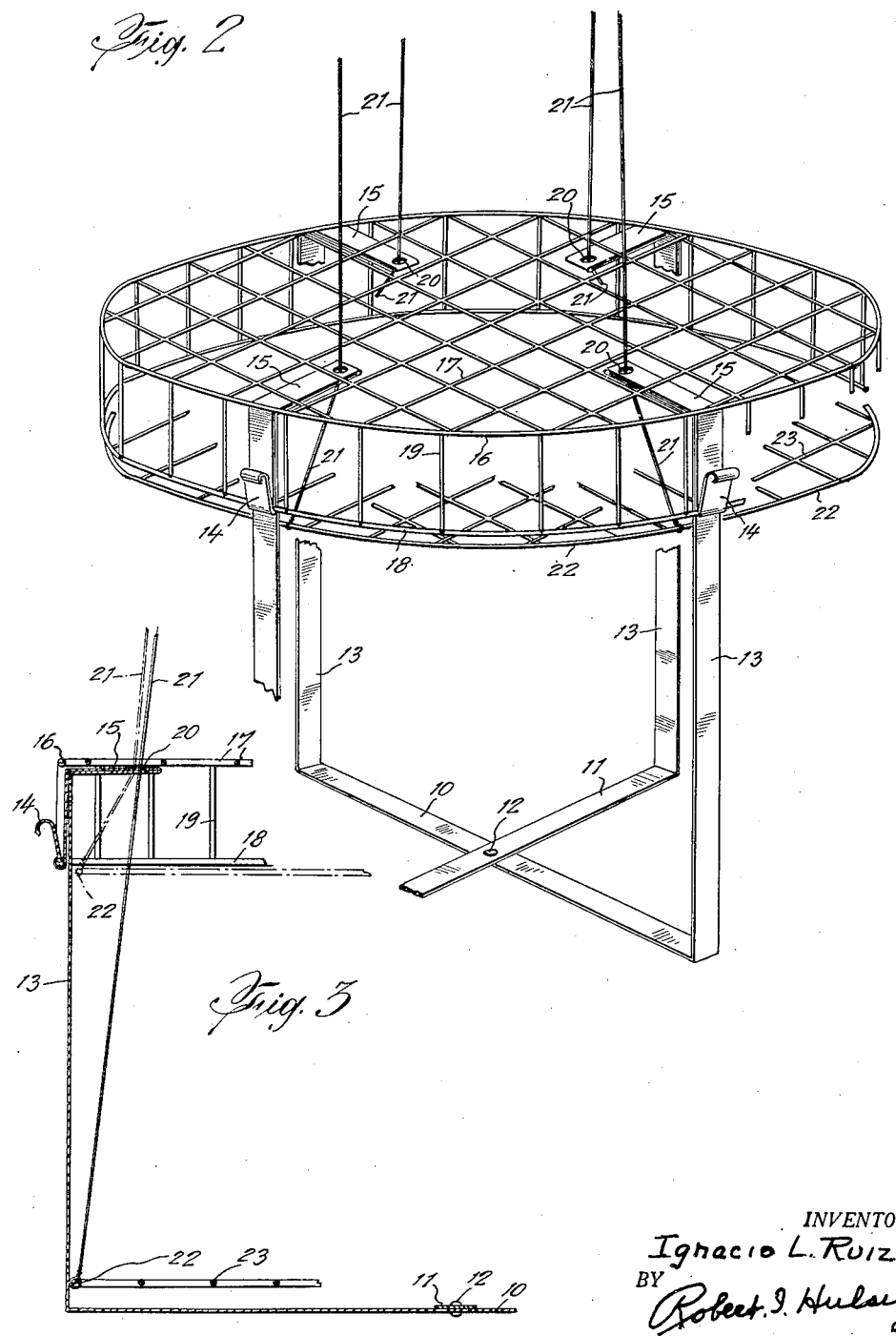
INVENTOR.
Ignacio L. Ruiz.
BY
Robert J. Hulsizer
atty.

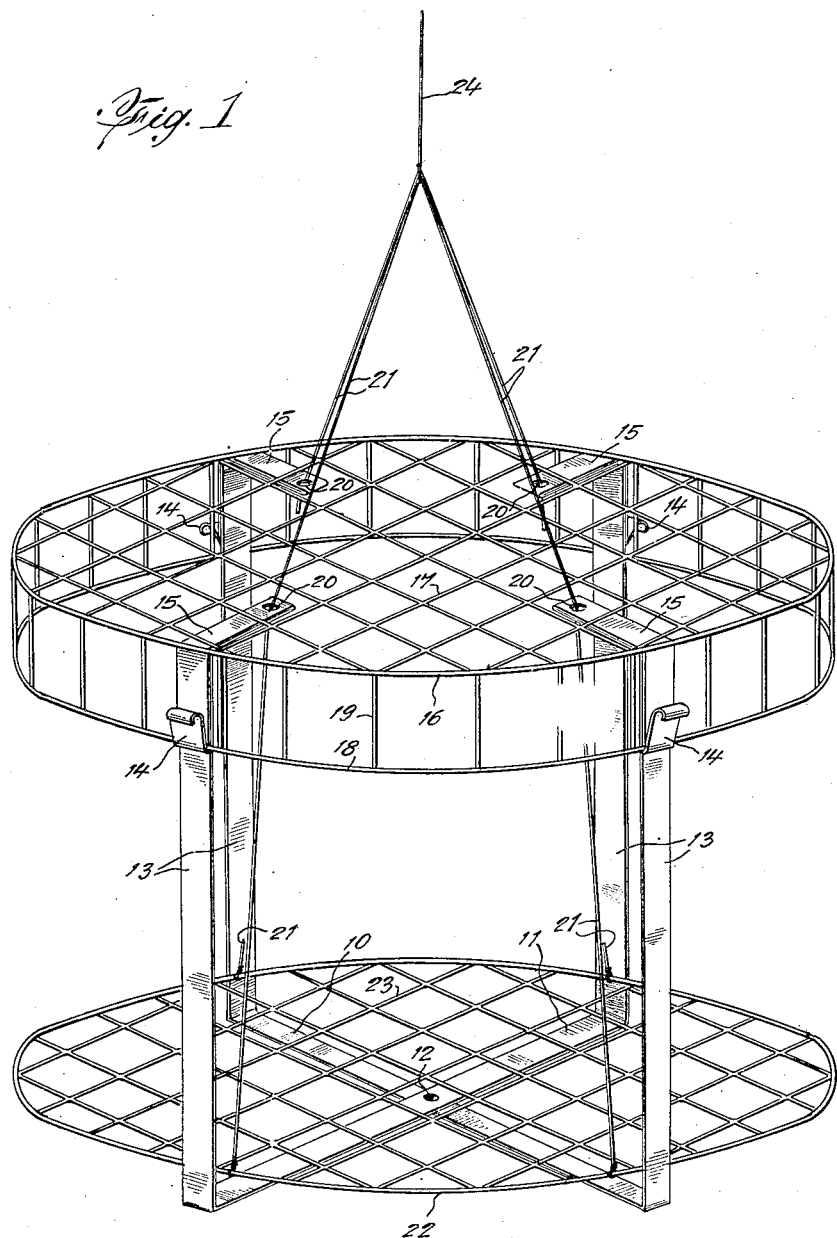

Patented June 21, 1949

2,473,910

UNITED STATES PATENT OFFICE 2,473,910

CRAB TRAP

Ignacio L. Ruiz, New York, N. Y.

Application July 28, 1944, Serial No. 546,998

2 Claims. (Cl. 43—105)

1

This invention relates to crab traps and particularly to a new and useful improvement therein which is simple, highly efficient, practical and economical to manufacture.

An object of the invention is to provide a crab trap which is so constructed that the fisherman will be aware the instant a crab is nibbling at the bait.

A further object of the invention is to provide a simple construction whereby the instant the crab is nibbling at the bait the fisherman can immediately and definitely cause the entrapment of the crab in a trap chamber.

A still further object is to provide a device which is relatively simple, light in weight, made of a few inexpensive parts, and which can be easily assembled and disassembled into a small compass for stowing away in a small space.

Still further objects, features, and advantages will more clearly appear from a consideration of the specification hereinafter set forth, especially when taken in connection with the accompanying drawings which show a present preferred form which the invention may assume and which forms part of the specification.

Briefly and generally considered, the invention includes a movable bait plate disposed slightly above the bottom and connected to the hand of the fisherman by a suitable connecting element so that the instant a crab nibbles at the bait the slight additional weight on the plate will be felt and the plate can be quickly moved to an entrapping position.

It further involves a trap chamber element which is suitably supported a definite distance above the bottom and has an open lower face. Below this trap chamber element the movable bait plate is disposed a certain distance, and when the crab mounts the bait plate to get at the bait and this weight is felt, the bait plate is jerked up quickly to a position where it forms a bottom closure for the trap chamber element so as firmly and definitely to enclose the crab therein.

The invention therefore includes a shallow inverted cup-shaped trap chamber supported on legs from the bottom, the legs acting as guides for a bait plate which moves up and down along the legs and is operated by a connection directly to the hand of the fisherman. The bait plate normally lies just above and close to the bottom and when pulled up to entrap the crab closes the open lower face of the chamber. The bait plate moves up and down in a horizontal position and involves no pivotal action.

The present preferred form which the invention

2 may assume is illustrated in the drawings, of which

Fig. 1 is a perspective view of the device with the parts in their position in the water to catch crabs;

Fig. 2 is a similar view showing the parts in their closed position to trap the crab; and Fig. 3 is a vertical partial section through the parts.

As shown in the drawings, which represent merely one present preferred form of the invention, there is shown a frame for supporting the trap chamber element and this frame or supporting means comprises flat strips 10 and 11 pivoted together at 12 and having upwardly extending vertical side members 13. By being pivoted, these frame elements can be moved to a position at right angles to each other as shown in the drawings, or can be moved to a closed position in which they occupy a much smaller compass for stowing away.

These vertical frame side members have at their upper ends latch fingers 14 and right angle flanges 15 as shown. Adapted to be supported on the upper portion of this frame is a trap chamber element comprising a wire basket, including an upper ring 16 with crossed wires 17 partly closing the upper face, a lower ring 18, and vertical spaced wires 19 forming partly closing side wall elements. The lower face of the trap chamber element is open and when supported on the frame is disposed downwardly. The flanges 15 are provided with apertures 20 through which are passed and guided connecting members such as fish lines or cords 21.

These cords 21 are at their lower ends connected to a ring 22 forming the outline of a lower bait plate provided with cross wires 23. This bait plate is disposed within the outlines of the frame members 13 and the bait is disposed thereon in the usual manner. The upper ends of the cords 21 are connected to a line 24 which leads to the hand of the fisherman. The diameter of the bait plate is slightly smaller than the diameter of the ring 18 so that when the bait plate is moved upwardly it can move within the ring 18 and is only stopped in its upward movement by the inwardly extending flanges 15 unless the body or a portion of a crab is disposed on the bait plate, in which case its upward movement may be stopped before it contacts with the flanges 15. Preferably the latch fingers 14 are formed to provide a notch or recess as shown in Fig. 3 so as to snap into engagement with the lower ring 18 and hold the trap chamber element in firm position at the top of the frame.

The practical operation of the device should be simple and clear and is as follows:

After the bait has been securely fastened to the lower plate, the device is lowered into the water. As it is being lowered of course it is obvious that the lower bait plate is disposed right beneath the trap chamber element and contacting the flanges 15 until the lower frame members 10 and 11 contact the bottom. At this time the upper trap chamber element is then disposed a definite distance above the bottom and the lower bait plate will then move by gravity down to whatever position the fisherman desires. It may be allowed to drop until it rests upon the frame members 10 and 11 but generally will be disposed a very slight distance above these members so that the connecting cords to the hand of the operator will support the weight of the bait plate and thus enable the operator to instantly feel any additional weight due to the introduction of the body and/or claw of a crab onto such bait plate. As soon as this additional weight is felt, and fishermen know how sensitive such connections are, the cord is jerked upwardly thus moving the bait plate upwardly to a position such as shown in Figs. 2 and 3, where the bait plate acts as a closure for the normally open lower face of the trap chamber element thus entrapping the body or claw of the crab. Thereupon further upward movement of the device by pulling on the cord 24 will lift the whole device upward out of the water so that the crab can be readily removed.

It is important to note that the invention includes a trap chamber with a lower open face supported on guide members from the bottom with a bait plate adapted to close the lower face of the chamber and movable and guided along the guide members, said bait plate being disconnected from the chamber and connected directly to the hand of the fisherman by a flexible connection such as a fish line. The bait plate moves separately from the movement of the chamber in trapping the crab, and moves in an upward and downward manner while still in a horizontal plane, and this movement involves no pivotal action on its part.

After the device is used and the fisherman wishes to pack same, he merely unsnaps the trap chamber element from the upper part of the frame, folds the frame strips together, and the entire device assumes a relatively flat relation which permits it to be stowed away in a very small compass. It is of course understood that making the trap chamber element and the bait plate of open wire construction is merely for the purpose of making it light in weight since they could readily be made of solid closed material such as sheet metal. It is of course clear that the upper trap chamber element could be supported above the bottom by other means than the particular frame elements shown and that this supporting element could guide the movement of the bait plate in a manner other than that shown.

While there is above described but one preferred embodiment of the invention, it is possible to produce still other embodiments thereof without departure from the inventive concept above disclosed, and it is therefore, desired that only such limitations shall be imposed on the appended claims as are stated therein, or required by the prior art.

What I claim is:

1. A crab trap which comprises a trap chamber element having a lower open face, U-shaped supporting elements pivoted to each other and having vertical side members, means on said side members to detachably engage and support the trap chamber element thereon with the open face disposed downwardly, a bait plate adapted to be guided by the U-shaped supporting elements and movable up and down within the supporting elements and adapted to move by gravity to a position below said open face, and connecting means attached to the bait plate and adapted to extend to the hand of the fisherman to permit the vertical movement of the bait plate relative to the trap chamber element.

2. A crab trap which comprises a trap chamber element having a lower open face, U-shaped supporting elements pivoted to each other and having vertical side members, inwardly extending apertured flanges disposed at the top of said side members, means on said side members to detachably engage and support the trap chamber element thereon with the open face disposed downwardly, a bait plate adapted to be guided by the U-shaped supporting elements and movable up and down within the supporting side elements and adapted to move by gravity to a position below said open face, and connecting means attached to the bait plate and adapted to extend through the apertures in said flanges to the hand of the fisherman to permit the vertical movement of the bait plate relative to the trap member element, whereby, when a crab is on the bait plate, said plate may be quickly moved upward to close the normally open lower face of the trap chamber element and thus entrap the crab therein.

IGNACIO L. RUIZ.

REFERENCES CITED

The following references are of record in the file of this patent:

UNITED STATES PATENTS

| Number | Name | Date |
|---|---|---|
| 348,118 | Fellrath | Aug. 24, 1886 |
| 563,356 | Broekelmann | July 7, 1896 |
| 708,380 | Merle | Sept. 2, 1902 |
| 987,492 | Roberts | Mar. 21, 1911 |
| 1,054,880 | Svoboda | Mar. 4, 1913 |
| 1,143,758 | Franklin | June 22, 1915 |
| 1,262,507 | Johnston | Apr. 9, 1918 |
| 1,779,300 | Weatherly | Oct. 21, 1930 |
| 2,165,516 | Stein et al. | July 11, 1939 |